(12) United States Patent
Kitamura

(10) Patent No.: US 9,090,300 B2
(45) Date of Patent: Jul. 28, 2015

(54) BICYCLE-USE MEASURING APPARATUS AND CONTROL METHOD

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 373 days.

(21) Appl. No.: 13/587,852

(22) Filed: Aug. 16, 2012

(65) Prior Publication Data

US 2013/0049860 A1 Feb. 28, 2013

(30) Foreign Application Priority Data

Aug. 29, 2011 (JP) .................................. 2011-186588

(51) Int. Cl.
 *G01L 3/02* (2006.01)
 *B62J 99/00* (2009.01)

(52) U.S. Cl.
 CPC ............ *B62J 99/00* (2013.01); *B62J 2099/002* (2013.01); *B62J 2099/0013* (2013.01); *B62K 2207/00* (2013.01)

(58) Field of Classification Search
 CPC .................. B62J 2099/0013; B62J 2099/002; B62K 2207/00
 USPC .......................................... 73/862.29, 862.31
 See application file for complete search history.

(56) References Cited

U.S. PATENT DOCUMENTS

| 496,639 | A | | 5/1893 | Clawson |
| 5,008,647 | A | * | 4/1991 | Brunt et al. .................... 340/432 |
| 5,027,303 | A | | 6/1991 | Witte |
| 5,031,455 | A | | 7/1991 | Cline |
| 5,432,442 | A | * | 7/1995 | Andersen ....................... 324/174 |
| 5,644,511 | A | * | 7/1997 | McWhorter ................... 702/148 |
| 6,199,021 | B1 | * | 3/2001 | Cote et al. ......................... 702/44 |
| 6,356,848 | B1 | * | 3/2002 | Cote et al. ......................... 702/44 |
| 6,418,797 | B1 | | 7/2002 | Ambrosina et al. |
| 6,924,569 | B2 | | 8/2005 | Endo et al. |
| 7,116,008 | B2 | * | 10/2006 | Kitamura et al. ............... 307/9.1 |
| 7,377,180 | B2 | | 5/2008 | Cunningham |
| 7,814,800 | B2 | | 10/2010 | Roovers et al. |
| 7,833,135 | B2 | * | 11/2010 | Radow et al. ..................... 482/57 |
| 7,861,599 | B2 | | 1/2011 | Meggiolan |
| 8,117,923 | B2 | | 2/2012 | Sasaki |
| 2005/0178210 | A1 | | 8/2005 | Lanham |
| 2005/0275561 | A1 | | 12/2005 | Kolda et al. |
| 2007/0186669 | A1 | | 8/2007 | Cunningham |
| 2009/0120208 | A1 | | 5/2009 | Meyer |
| 2010/0264622 | A1 | | 10/2010 | Bastianen |
| 2011/0006760 | A1 | | 1/2011 | Glueck et al. |

FOREIGN PATENT DOCUMENTS

| JP | 62-126739 U | 8/1987 |
| JP | 2007-19787 A | 1/2007 |
| JP | 2009-6991 A | 1/2009 |
| JP | 2009-509830 A | 3/2009 |
| JP | 2009-195050 A | 8/2009 |
| WO | 2009/041820 A1 | 4/2009 |
| WO | 2011/030215 A1 | 3/2011 |

* cited by examiner

*Primary Examiner* — Max Noori
(74) *Attorney, Agent, or Firm* — Global IP Counselors

(57) ABSTRACT

A bicycle-use measuring apparatus includes a sensor, a signal amplifying section and a gain control section. The sensor is configured to be installed on a bicycle having a rotating part. The signal amplifying section amplifies an output of the sensor. The gain control section adjusts a gain of the signal amplifying section in accordance with changes in a rotational state of the rotating part.

15 Claims, 7 Drawing Sheets

BICYCLE-USE MEASURING APPARATUS AND CONTROL METHOD

CROSS-REFERENCE TO RELATED APPLICATIONS

This application claims priority under 35 U.S.C. §119 to Japanese Patent Application No. 2011-186588, filed Aug. 29, 2011. The entire disclosure of Japanese Patent Application No. 2011-186588 is hereby incorporated herein by reference.

BACKGROUND

1. Field of the Invention

This invention generally relates to a bicycle-use measuring apparatus and a control method. More specifically, the present invention relates to a bicycle-use measuring apparatus for a sensor that measures a physical quantity that changes in response to changes in a riding state of a bicycle.

2. Background Information

Japanese Laid-Open Patent Publication No. 2009-006991 discloses a control apparatus for a power meter that measures a power exerted to rotate a bicycle wheel, crank, or other rotating part. As shown in FIG. 10, the control apparatus disclosed in this Japanese Patent Publication comprises a cadence sensor 51, a strain gauge 52, an amplifier 53, an A/D converter 54, a processor 55 and a wireless transmitter 56. The cadence sensor 51 measures cadence (the rotational speed of the crank). The strain gauge 52 measures a strain of the crankshaft occurring when a rider depresses a pedal. The amplifier 53 amplifies an analog electric signal outputted from the strain gauge 52 to a range that can be processed by the A/D converter 40. The A/D converter circuit 54 converts the amplified analog electric signal to a digital signal. The processor 55 calculates the torque acting on the crankshaft based on this digital electric signal. The processor 55 calculates a power imparted by the rider based on this torque and the cadence outputted from the cadence sensor 51. The wireless transmitter 56 transmits the power or torque calculated by the processor 55 to a cycling computer or the like (not shown).

SUMMARY

In the control apparatus disclosed in the above mentioned Japanese Patent Publication, it is necessary to set the gain in accordance with a maximum value of the signal detected by the strain gauge 52 (the output corresponding to when a pedal depression force is largest), since the gain of the amplifier 53 is fixed and the input voltage of an A/D converter is generally limited. Consequently, when the pedal depression force is small, the signal detected by the strain gauge 52 is not very large even if it is amplified by the amplifier 53. Thus, in order to measure the signal detected by the strain gauge accurately even when the pedal depression force is small, it is necessary for the A/D converter 54 to finely quantize the signal detected by the strain gauge. Therefore, it is necessary to use a high-precision A/D converter 54 having a large quantization bit rate.

When the quantization bit rate is larger, the size of analog voltage corresponding to one bit at the A/D converter 54 is smaller and, consequently, the signal is more readily affected by signal noise.

One object of the present invention is to provide a control apparatus and a control method for a bicycle sensor that enables a sensor output to be measured accurately without using a high-precision A/D converter.

Another object of the present invention is to provide a control apparatus and control method for a bicycle sensor that reduces the effects of noise in the signal.

In order to achieve the aforementioned objects, a bicycle-use measuring apparatus is provided that basically comprises a sensor, a signal amplifying section and a gain control section. The sensor is configured to be installed on a bicycle having a rotating part. The signal amplifying section amplifies an output of the sensor. The gain control section adjusts a gain of the signal amplifying section in accordance with changes in a rotational state of the rotating part.

In order to achieve the aforementioned objects, a control method is provided that basically comprises providing a sensor on a bicycle having a rotating part, adjusting a gain to an adjusted gain for amplifying an output of the sensor in accordance with changes in a rotational state of the rotating part, and amplifying the output of the sensor using the adjusted gain.

A range of force that a person can exert against a rotating part of a bicycle varies depending on a rotational state of the rotating part. For example, the pedal depression force exerted by a person varies in accordance with the cadence of the crank (See, reference: Fujii, Noriaki, *The Science of Road Bikes*, Ski Journal Publisher, Inc., 2008). FIG. 11 shows a depression force characteristic of a person. According to the characteristic, while there is some difference among individuals, the maximum torque that a person can exert against a rotary shaft of a bicycle is comparatively large when the cadence is low and decreases as the cadence increases. Utilizing this characteristic, a control apparatus and control method according to the present invention adjusts the gain according to the range of force that a person can exert against a rotating part of the bicycle depending on the rotational state of the rotating part such that a range of attainable amplified voltages approaches a dynamic range of the A/D converter.

The control apparatus and control method according to the present disclosure can adjust the gain of the signal amplifying section (which amplifies the output of the sensor) in accordance with the rotational state of the rotating part such that the output of the sensor is amplified with an appropriate gain. Thus, even if the output of the sensor varies greatly, the output value of the sensor can be measured accurately without requiring the use of a high-precision A/D converter having a high quantization bit rate. As a result, a manufacturing cost can be reduced.

Furthermore, since it is not necessary to use a high-precision A/D converter having a high quantization bit rate, the analog voltage corresponding to one bit at the A/D converter can be increased on the effect of noise can be reduced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
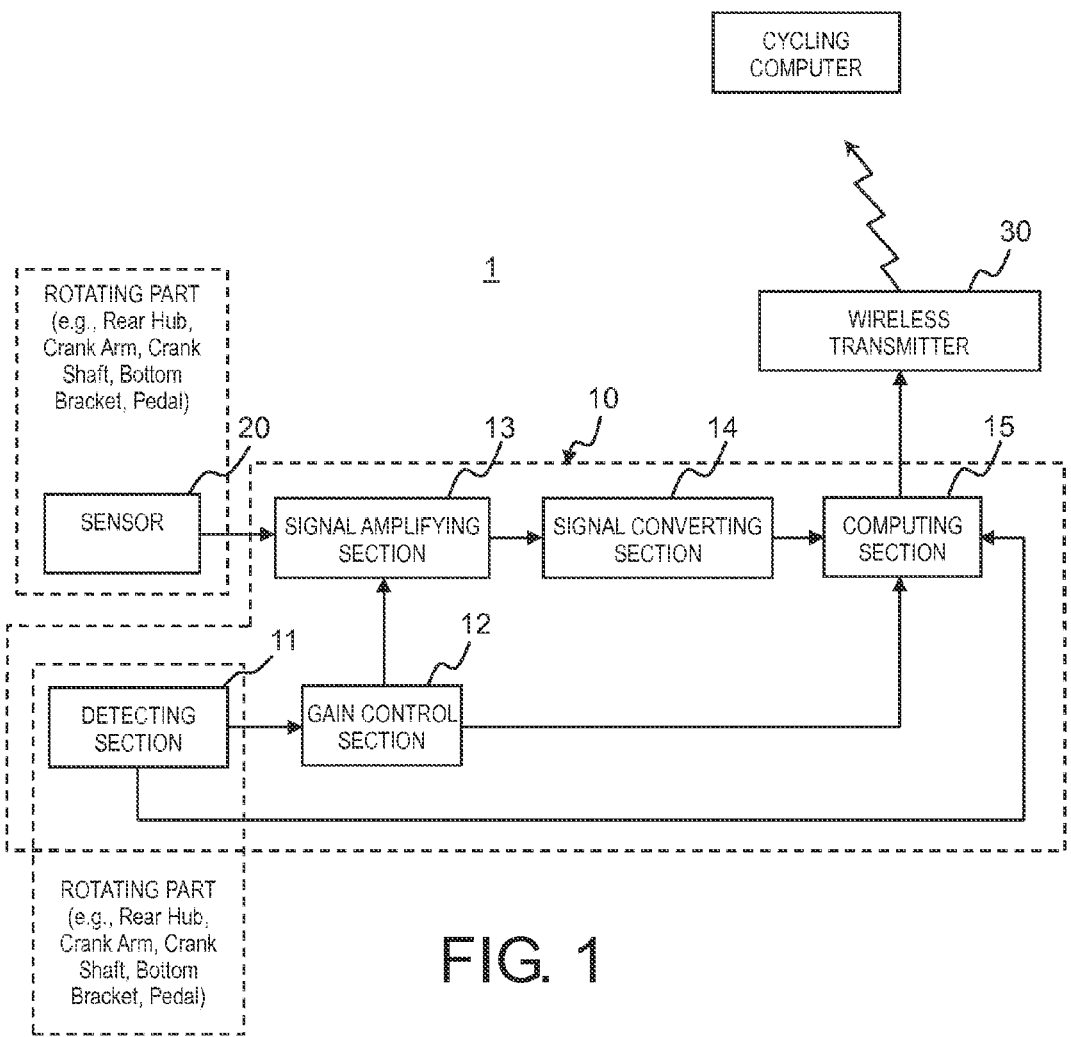
FIG. 1 is a block diagram showing a schematic configuration of a bicycle-use measuring apparatus according to a first embodiment.

A bicycle-use measuring apparatus 1 according to a first embodiment of the present invention will now be explained. FIG. 1 is a block diagram showing a schematic configuration of a bicycle-use measuring apparatus according to this embodiment. The bicycle-use measuring apparatus 1 can be installed on both normal bicycles that advance when a rider pedals and stationary bicycles, such as exercise bicycles. The bicycle-use measuring apparatus 1 comprises a sensor signal control apparatus 10, a sensor 20, and a wireless transmitter 30. The sensor signal control apparatus 10 comprises a detecting section 11 (a rotational state detector), a gain control section 12 (a gain control circuit), a signal amplifying section 13 (a signal amplifier), a signal converting section 14 (a signal converter) and a computing section 15 (a processor).

The control apparatus 10 adjusts a gain of the output signal from the sensor 20, which is installed on a bicycle, in accordance with a rotational state of a rotating part of the bicycle. Examples of the rotating part include a wheel, a crank, a hub, a sprocket, a pulley, and a pedal. The crank includes a crankshaft and a pair of crank arms provided on both ends of the crankshaft.

The sensor 20 measures a physical quantity that changes in response to changes in a riding state of the bicycle. The physical quantity is typically the torque acting on the rotating part or a power work rate required to rotate the rotating part, but such quantities as a chain tension, a pedal depression force, and a twisting or sagging of a handlebar or a frame are also included in the concept of the physical quantity. The sensor 20 is installed on a part that is a portion of the bicycle and subjected to a force applied by a rider. Parts that are subjected to a force applied by a rider include, for example, a crank arm, a crankshaft, a pedal, a bottom bracket, a frame, a handlebar and a saddle. The sensor 20 can be mounted on the same rotating part as the detecting section 11, or a different rotating part from that of the detecting section 11, if needed and/or desired. Although the sensor 20 is atypical strain gauge, it is acceptable for the sensor 21 to be a magnetostrictive element, a displacement sensor, or a pressure sensor that utilizes a fluid. Thus, the sensor 20 is preferably a torque measurement sensor or a rider power measurement sensor, which can more broadly be considered a rider force measurement sensor.

Data related to the physical quantity measured by the sensor 20 is outputted from the control apparatus 10, and the circuit of the wireless transmitter 30 transmits the data to a cycling computer.

The detecting section 11 is a rotational state sensor that detects a rotational state of one of the aforementioned rotating part. Preferably, the detecting section 11 detects a cadence of the crank, which includes a crankshaft and a pair of crank arms provided on both ends of the crankshaft.

The gain control section 12 adjusts the gain of the signal amplifying section 13 in accordance with the rotational state of the rotating part. More specifically, the gain control section 12 decreases the gain of the signal amplifying section 13 when the cadence is small and increases the gain of the signal amplifying section 13 when the cadence is large. The signal amplifying section 13 amplifies an analog electric signal outputted from the sensor 20 using the gain adjusted by the gain control section 12. The operation of the gain control section 12 and the signal amplifying section 13 will be explained in more detail later.

The signal converting section 14 converts the amplified analog electric signal to a digital signal. An A/D converter is preferably used as the signal converting section 14. Based on the digital signal, the computing section 15 calculates the physical quantity that changes in response to changes in the riding state of the bicycle. For example, it is acceptable for the sensor 20 to be installed on a rear hub and for the computing section 15 to calculate the torque acting on the rear hub based on an output from the sensor 20. It is also acceptable for the sensor 20 to be installed on a crank arm or the crankshaft and for the computing section 15 to calculate the torque acting on the crankshaft based on an output from the sensor 20. It is also acceptable for the sensor 20 to be installed on the bottom bracket and for the computing section 15 to calculate a chain tension based on an output from the sensor 20. It is also acceptable for the sensor 20 to be installed on a pedal and for the computing section 15 to calculate the torque acting on a pedal shaft based on an output from the sensor device 20. Furthermore, it is acceptable for the computing section 15 to calculate a pedaling power of the rider pedaling the bicycle and an output power of a rear wheel based on the aforementioned torque, chain tension, or force calculated based on the output of the sensor 20.

Figure 2:
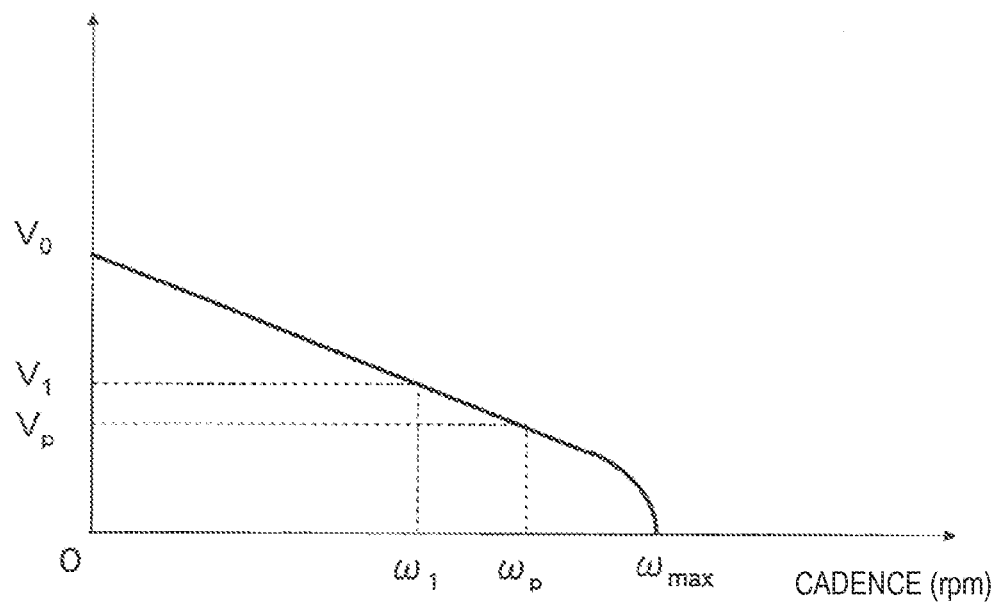
FIG. 2 is a graph showing an example of a relationship between cadence and a voltage outputted by the sensor during a maximum torque.
Figure 11:
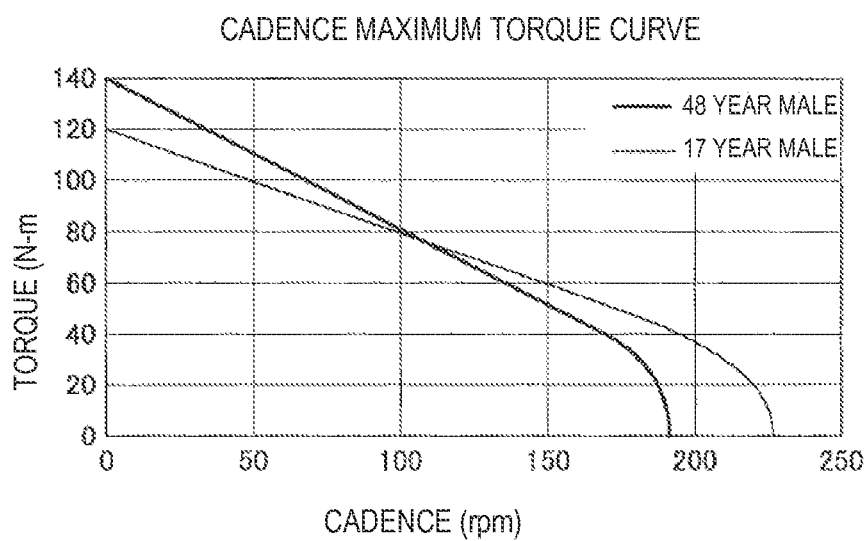
FIG. 11 shows a depression force characteristic of a person.

The operation of the gain control section 12 and the signal amplifying section 13 will now be explained in detail using an example situation in which the sensor 20 outputs a voltage signal in response to a torque acting on a rotating part of the bicycle. FIG. 2 shows an example of a relationship between cadence and a voltage outputted by the sensor 2 during a maximum torque when the sensor 20 is a strain gauge. According to the figure, while there is some difference among individuals, the maximum torque that a person can exert against a rotary shaft of a bicycle is comparatively large when the cadence is low and decreases as the cadence increases. A strain amount indicated by the strain gauge, i.e., an output voltage of the strain gauge, is substantially proportional to the cadence. Thus, the graph shown in FIG. 2 expressing the relationship between the cadence and the output voltage of the strain gauge has a shape similar to the shape of the graph shown in FIG. 11 expressing the depression force characteristic. Any type of sensor can be used as the sensor 20 in the present invention so long as it outputs a voltage that increases as the size of the detected physical quantity increases. The voltage outputted from the sensor 20 during a maximum torque gradually decreases as the cadence increases.

Figure 3:
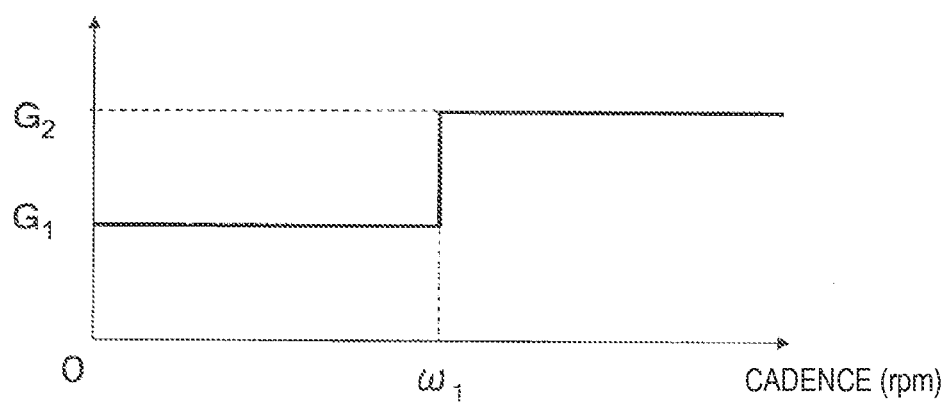
FIG. 3 illustrates an example of a gain adjusting method employed by a gain control section.

FIG. 3 illustrates an example of a gain adjusting method employed by a gain control section 12. In this example, the gain control section 12 changes the gain from $G_1$ to $G_2$ (where $G_1 < G_2$) when the cadence becomes larger than a prescribed threshold value $\omega 1$. The values of $\omega 1$, $G_1$, and $G_2$ are determined based experience in accordance with the characteristics of the sensor 20 and the signal converting section 14.

Figure 4:
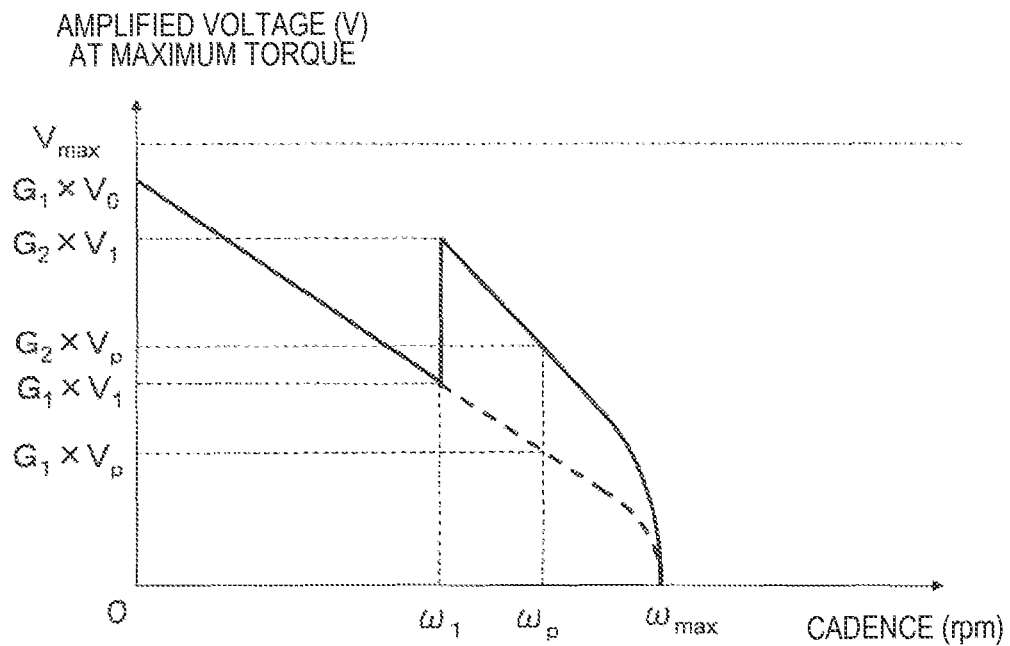
FIG. 4 is a graph showing an example of a relationship between cadence and a voltage outputted during a maximum torque after the voltage has been amplified using the gain adjusted as shown in FIG. 3.

FIG. 4 is a graph showing an example of a relationship between cadence and the voltage outputted from the sensor 20 during a maximum torque after the signal amplifying section 13 has amplified the signal shown in FIG. 2 using the gain adjusted by the gain control section 12 as shown in FIG. 3. The voltage $V_{max}$ shown in FIG. 4 is a maximum value of the input voltage of the signal converting section 14. As illustrated with the solid line curve of the graph in FIG. 4, the voltage outputted by the sensor 20 is amplified using the gain $G_1$ when the cadence is between 0 and $\omega_1$ (equal to or larger than 0 and smaller than $\omega_1$) and amplified using the gain $G_2$ when the cadence is between $\omega 1$ and $\omega_{max}$ (equal to or larger than $\omega 1$ and smaller than or equal to $\omega_{max}$). It is necessary for both the maximum value $G_1 \times V_0$ of the amplified voltage in the range of cadences 0 to $\omega_1$ and the maximum value $G_2 \times V_1$ of the amplified voltage in the range of cadences from 0 to $\omega 1$ to be equal to or smaller than $V_{max}$. However, in order to improve a measurement accuracy of the bicycle-use measuring apparatus 1, it is preferable for both of the values $G_1 \times V_0$ and $G_2 \times V_1$ to be close to $V_{max}$.

Assuming the quantization bit rate of the signal converting section 14 is N (where N is a real number) and assuming the size of the analog voltage corresponding to one bit is always constant, the size of the analog voltage corresponding to one bit at the signal converting section 14 is given by $V_{max}/2^N$. Assuming a voltage $V_p$ is outputted from the sensor 20 during a maximum torque when the cadence is any cadence $\omega_p$ between $\omega_1$ and $\omega_{max}$, if the same gain $G_1$ is used as in the cadence range 0 to $\omega_1$, then the voltage at $\omega_p$ will be expressed essentially with a number of bits given by $\log_2(V_p/V_{max})+N$ because the high-order bit will be 0. Conversely, if the gain is changed from $G_1$ to $G_2$ as shown in FIG. 3, then the voltage at $\omega_p$ will be expressed essentially with a number of bits given by $\log_2(G_2/G_1 \times V_p/V_{max})+N$. When the gain control section 12 increases the gain in this way, the number of bits expressing voltage at $\omega_p$ is substantially increased. Since the voltage corresponding to one bit at the converting section 14 is constant, substantially increasing the number of bits expressing the voltage results in an increase of the resolution of the digital signal corresponding to the voltage. For example, if N=4 and $V_{max}$=8 V, then when $V_p$=4 V, the high-order bit is 0 and thus the voltage at $\omega_p$ is expressed with $\log_2(4/8)+4=3$ bits.

When the gain is fixed at $G_1$, if $V_p$ is expressed with, for example, 256 bits in order to measure the output voltage of the sensor 20 with the same degree of accuracy as can be achieved by changing the gain to $G_2$ when the cadence is between $\omega 1$ and $\omega_{max}$, then naturally the number of bits expressing $V_{max}$ will be larger than 256 bits. Consequently, an A/D converter having a larger bit count will be required. In this embodiment, the torque can be determined accurately using an inexpensive A/D converter having a small quantization bit rate as the signal converting section 14 by appropriately selecting the threshold value $\omega 1$ of the cadence and the values of the gains $G_1$ and $G_2$.

Since the amplitude voltage of background noise occurring in the electric circuitry is substantially constant, the portion of the output voltage of the sensor 20 that is made up of noise increases as the output voltage becomes smaller. By adjusting the gain, the output voltage of the sensor 20 can be increased and the portion of the output voltage that is made up of noise can be reduced. As a result, the voltage can be measured more accurately and the torque can be determined more accurately.

Figure 5:
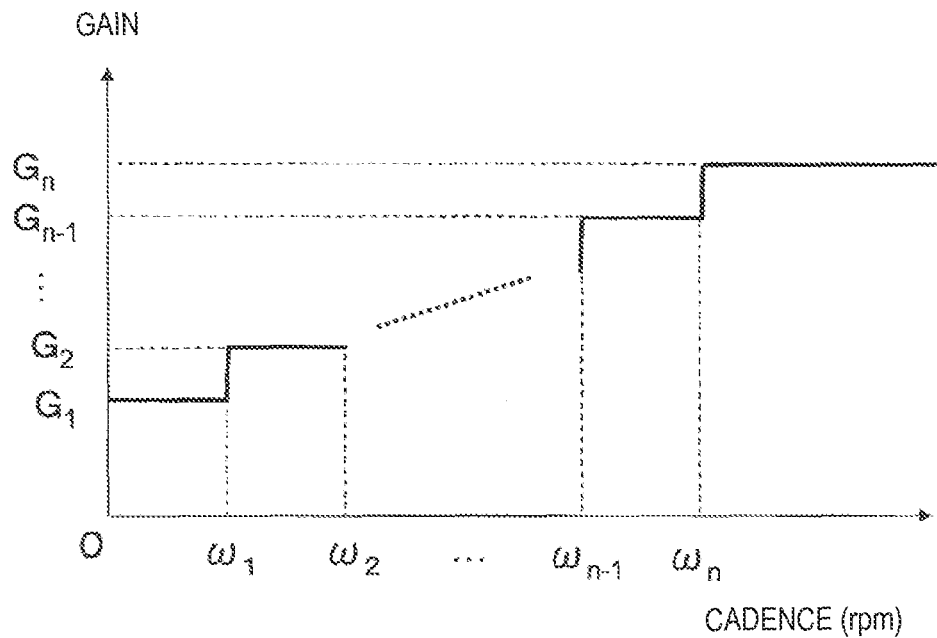
FIG. 5 illustrates an example of a gain adjusting method employed by a gain control section.
Figure 6:
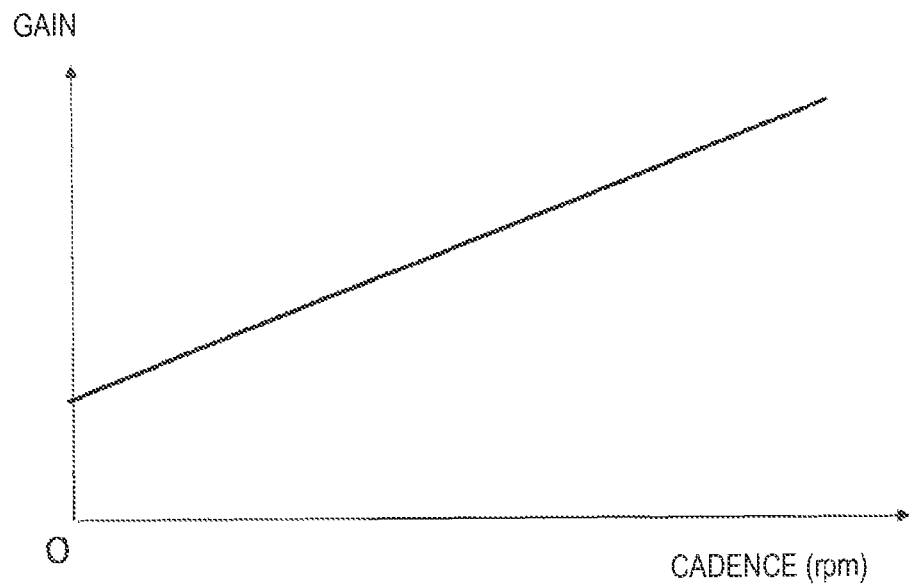
FIG. 6 illustrates an example of a gain adjusting method employed by a gain control section.

The gain control section 12 is not limited to using a gain adjusting method in which the gain is switched between two gains as shown in FIG. 3. It is acceptable to change the gain in three or more stages according to the cadence such that the gain increases as the cadence increases, as shown in FIG. 5. It is also acceptable if the gain control section 12 uses a gain adjusting method in which the gain is varied in a continuous manner with respect to the cadence such that the gain increases as the cadence increases, as shown in FIG. 6. While the gain adjusting method shown in FIG. 6 increases the gain in a linear manner with respect to the size of the cadence, it is also acceptable to increase the gain according to a curve so long as the gain increases as the cadence increases.

Figure 7:
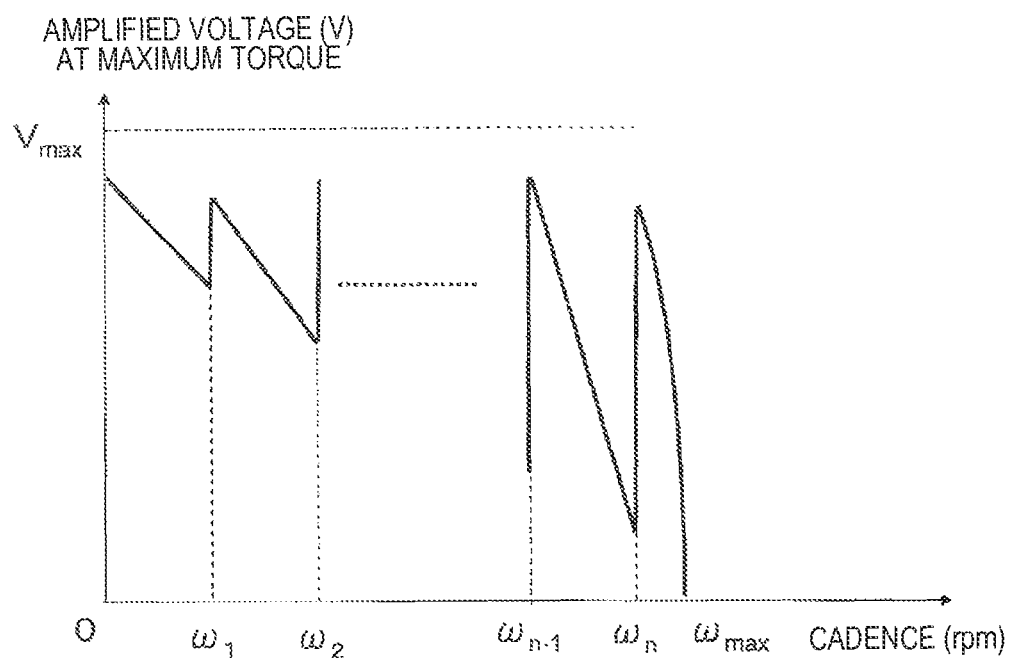
FIG. 7 is a graph showing an example of a relationship between cadence and a voltage outputted during a maximum torque after the voltage has been amplified using the gain adjusted as shown in FIG. 5.
Figure 8:
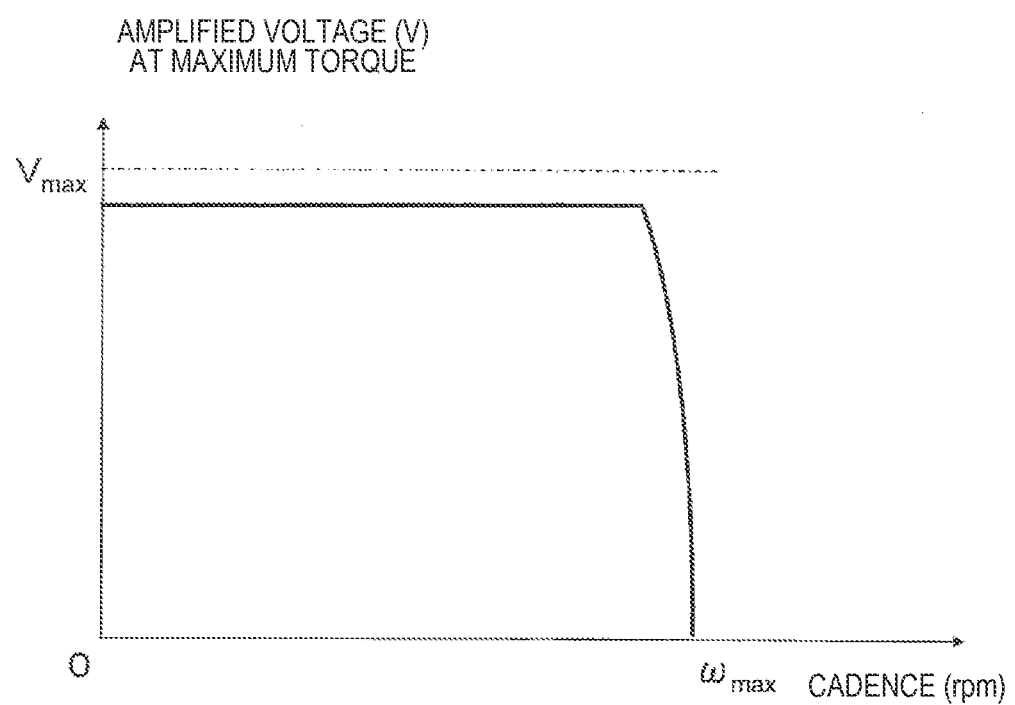
FIG. 8 is a graph showing an example of a relationship between cadence and a voltage outputted during a maximum torque after the voltage has been amplified using the gain adjusted as shown in FIG. 6.

FIG. 7 is a graph showing an example of a relationship between cadence and a voltage outputted during a maximum torque after the voltage has been amplified using the gain adjusted by using the method shown in FIG. 5. FIG. 8 is a graph showing an example of a relationship between cadence and a voltage outputted during a maximum torque after the voltage has been amplified using the gain adjusted using the method shown in FIG. 6. Here, too, the output that results when a maximum attainable value of the output of the sensor 20 corresponding to each of the gains ($G_1$ to $G_n$ in the example shown in FIG. 5) is amplified with each of the gains ($G_1$ to $G_n$ in the example shown in FIG. 5) needs to be equal to or smaller than the maximum value $V_{max}$ of the input voltage of the converter 14. Meanwhile, in order to improve the measurement accuracy of the bicycle-use measuring device 1, the maximum value that can result after the output of the sensor 20 is amplified with each of the gains ($G_1$ to $G_n$ in the example shown in FIG. 5) is preferably close to the voltage $V_{max}$. The bicycle-use measuring device 1 according to the embodiment exhibits the same effects when the gain control section 12 adjusts the gain as shown in FIG. 5 and FIG. 6 as when it adjusts the gain as shown in FIG. 3.

Figure 9:
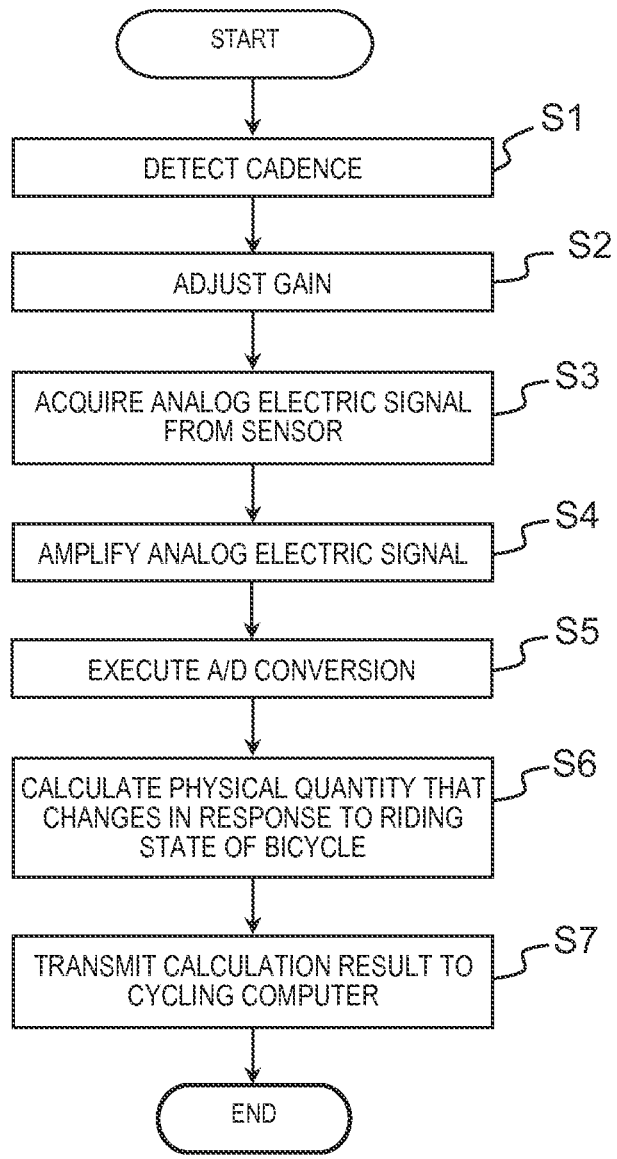
FIG. 9 is a flowchart of a process executed by a bicycle-use measuring apparatus according to the first embodiment.
Figure 10:
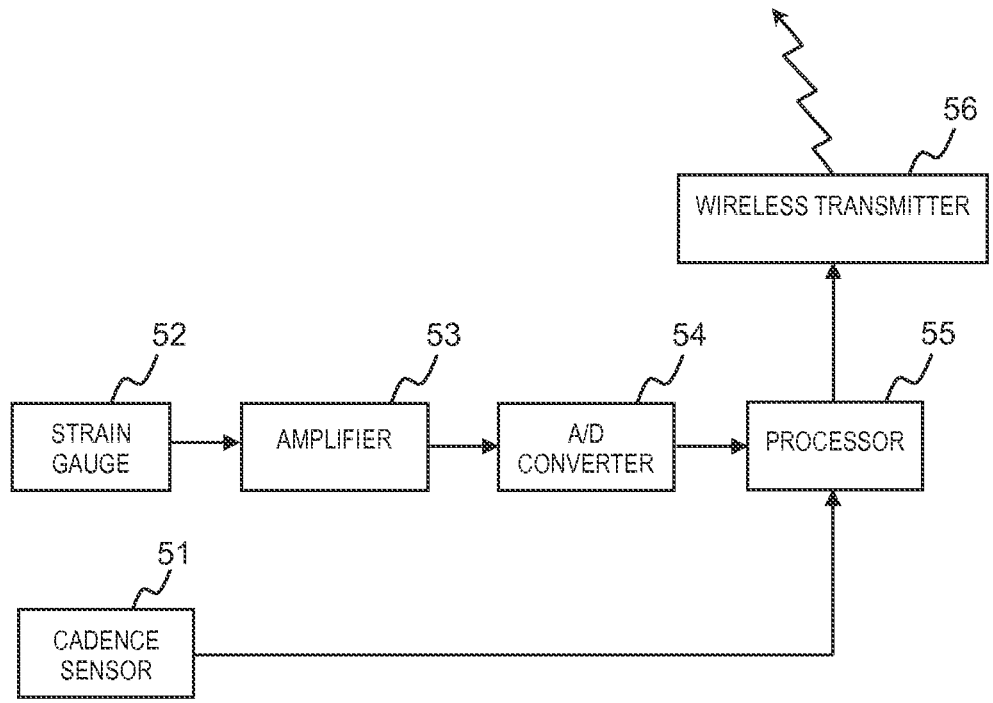
FIG. 10 is a block diagram schematically showing the main components of a conventional control apparatus.

The processing steps executed by the bicycle-use measuring device according to this embodiment will now be explained. FIG. 9 is a flowchart showing the process steps executed by the bicycle-use measuring device according to the embodiment.

First, the detecting section 11 detects the cadence (step S1). Next, the gain control section 13 adjusts the gain based on the detected cadence (step S2). Although any of the methods of adjusting the gain illustrated in FIGS. 3, 5 and 6 can be used, the invention is not limited to these methods. Any method is acceptable so long as the output that results when a maximum attainable value of the output of the sensor 20 corresponding to each of the gains is amplified with each of the gains is equal to or smaller than the maximum value of the input voltage of the signal converting section and so long as the gain is increased as the cadence increases.

Next, the signal amplifying section 13 acquires an analog signal from the sensor 20 (step S3). The signal amplifying section 13 amplifies the analog electric signal based on the gain adjusted by the gain control section 13 (step S4). The signal converting section 14 converts the amplified analog electric signal to a digital signal (step S5).

Based on the digital signal, the computing section 15 calculates the physical quantity that changes in response to changes in the riding state of the bicycle (step S6). Typically, the computing section 15 calculates a pedal depression force, a chain tension, or a torque acting on a rotating part such as a rear hub, a rear wheel, or a crankshaft based on the output from the sensor 20, which is installed on a pedal, a bottom bracket, a crankshaft, a crank arm, or a rear hub. Since the gain used by the signal amplifying section 13 differs depending on the cadence, the computing section 15 acquires information regarding the gain used from the gain control section 12 and calculates a torque, a chain tension, or a pedal depression force using a value obtained by multiplying a discrete value expressing the digital signal acquired from the signal converting section 14 by the reciprocal of the gain. The computing section 15 then calculates a power that the bicycle outputs and/or a power that the rider outputs using a predetermined computational formula and information related to the pedal depression force, the chain tension, the cadence detected by the detecting section 11, or the torque acting on a rotating part being measured. For example, the computing section 15 can calculate the power exerted by the rider to pedal the bicycle using the equation (1) shown below based on the torque acting on the crankshaft and the cadence detected by the detecting section 11.

$$\text{Power}(W) = \text{Torque}(N \cdot m) \times \text{Cadence}(\text{rpm}) \times 2\pi/60 \quad (1)$$

Also, for example, the physical quantity calculating section 15 can calculate a power that the bicycle outputs based on the torque acting on the rear wheel and the rotational speed of the rear wheel.

It is also acceptable for the computing section 15 to calculate a different physical quantity based on an output signal of the sensor 20. Examples of other physical quantities include chain tension, pedal depression force, and a twisting or sagging of the handlebar or frame.

Lastly, the wireless transmitter 30 transmits the calculation result calculated by the computing section 15 to the cycling computer (S7).

The effects of this first embodiment will now be explained. The control apparatus 10 of this embodiment adjusts the gain such that the gain used by the signal amplifying section 13 increases as the cadence increases. The control apparatus 10 can widen a voltage range inputted to the signal converting section 14 when the cadence is large. As a result, in comparison with a device in which the gain is fixed, the output voltage of the sensor 20 can be quantized more finely when the cadence is large. Thus, a highly accurate A/D converter having a large quantization bit rate is not necessary and the manufacturing cost is reduced.

The control apparatus 10 can also reduce the effects of noise because it can increase the analog voltage corresponding to one bit at the signal converting section 14.

It is acceptable for the control apparatus to be configured as shown in FIG. 1 accept that the signal converting section 14 and the computing section 15 are omitted. In such a case, it is acceptable for the control apparatus 10 to generate a prescribed signal based on the output voltage of the signal amplifying section 13 and the size of the gain adjusted by the gain control section 12 and transmit the signal to a cycling computer using the wireless transmitter 30. The cycling computer then decodes the signal to acquire the output voltage of the signal amplifying section 13 and the gain adjusted by the gain control section 12 and executes similar processing to that executed by the signal converting section 14 and the computing section 15.

It is also acceptable for the control apparatus 10 not to have a computing section 15, to be provided with a storage section that simply stores information outputted from the signal converting section 14 and information outputted from the gain control section 12, and to be configured to read information stored in the storage section either wirelessly or using a hard connection. Also, if data related to the physical quantity measured by the sensor 20 is transmitted to the cycling computer through a wire, then it is acceptable to omit the wireless transmitter 30. It is also acceptable to equip the control apparatus 10 with an interface so that the control apparatus 10 can employ an external computer to change the gain set by the gain control section.

Although the gain control section 12 and the computing section 15 are realized with a typical microcomputer in the embodiment, it is acceptable for them to be realized with a CPU (central processing unit) interpreting and executing executable program data that have been stored in a storage device (ROM, RAM, etc.) and can be executed in the order of the previously explained process. It is also acceptable for the gain control section 12, the signal converting section 14, and the computing section 15 to be realized with one microcomputer.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so tong as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle-use measuring apparatus comprising:
    a sensor configured to be installed on a bicycle;
    a signal amplifying section that amplifies an output of the sensor; and
    a gain control section that is programmed to adjust a gain of the signal amplifying section in accordance with a rotational state signal indicating a detected rotational state of a rotating part of the bicycle,
    the rotating part being a crank, a sprocket, a pulley or a pedal.

2. A bicycle-use measuring apparatus comprising:
a sensor configured to be installed on a bicycle;
a signal amplifying section that amplifies an output of the sensor;
a crank cadence detector that detects a cadence of a crank of the bicycle; and
a gain control section that is programmed to adjust a gain of the signal amplifying section in accordance with the detected cadence.

3. The bicycle-use measuring apparatus as recited in claim 2, wherein
the gain control section increases the gain of the signal amplifying section as the detected value of the cadence increases.

4. The bicycle-use measuring apparatus as recited in claim 3, wherein
the gain control section sets the gain of the signal amplifying section to a first gain when the detected value of the cadence is smaller than a prescribed value and sets the gain of the signal amplifying section to a second gain that is larger than the first gain when the detected value of the cadence is equal to or larger than the prescribed value.

5. The bicycle-use measuring apparatus as recited in claim 3, further comprising
a signal converting section that converts an output of the signal amplifying section into a digital signal.

6. The bicycle-use measuring apparatus as recited in claim 5, wherein
the gain control section adjusts the gain of the signal amplifying section such that a maximum value attainable by amplifying the output of the sensor at the adjusted gain is equal to or smaller than a maximum value of an input of the signal converting section.

7. The bicycle-use measuring apparatus as recited in claim 4, further comprising
a signal converting section that converts an output of the signal amplifying section into a digital signal.

8. The bicycle-use measuring apparatus as recited in claim 7, wherein
the second gain is set such that when the signal amplifying section amplifies the output of the sensor at the second gain due to the detected cadence being equal to or larger than the prescribed value, a maximum value attainable by amplifying the output of the sensor at the second gain is equal to or smaller than a maximum value of an input of the signal converting section.

9. The bicycle-use measuring apparatus as recited in claim 7, wherein
the first gain is set such that when the signal amplifying section amplifies the output of the sensor at the first gain due to the detected cadence being smaller than the prescribed value, a maximum value attainable by amplifying the output of the sensor at the first gain is equal to or smaller than a maximum value of an input of the signal converting section.

10. The bicycle-use measuring apparatus as recited in claim 1, wherein
the rotating part is a crank.

11. The bicycle-use measuring apparatus as recited in claim 1, wherein
the sensor detects a physical quantity that changes in response to a change in a riding state of the bicycle.

12. The bicycle-use measuring apparatus as recited in claim 11, wherein
the physical quantity detected by the sensor is either a torque acting on the rotating part or a power exerted to rotate the rotating part.

13. The bicycle-use measuring apparatus as recited in claim 12, wherein
the rotating part is a crank.

14. A bicycle-use measuring apparatus comprising:
a sensor configured to be installed on a bicycle, the sensor detecting either a torque acting on a rotating part of the bicycle or a power exerted to rotate the rotating part as a physical quantity that changes in response to a change in a riding state of the bicycle;
a signal amplifying section that amplifies an output of the sensor; and
a gain control section that is programmed to adjust a gain of the signal amplifying section in accordance with a rotational state signal indicating a detected rotational state of the rotating part.

15. The bicycle-use measuring apparatus as recited in claim 14, wherein
the computing section calculates at least one of the torque and the power based on an output of the gain control section.

* * * * *